Patented Apr. 20, 1948

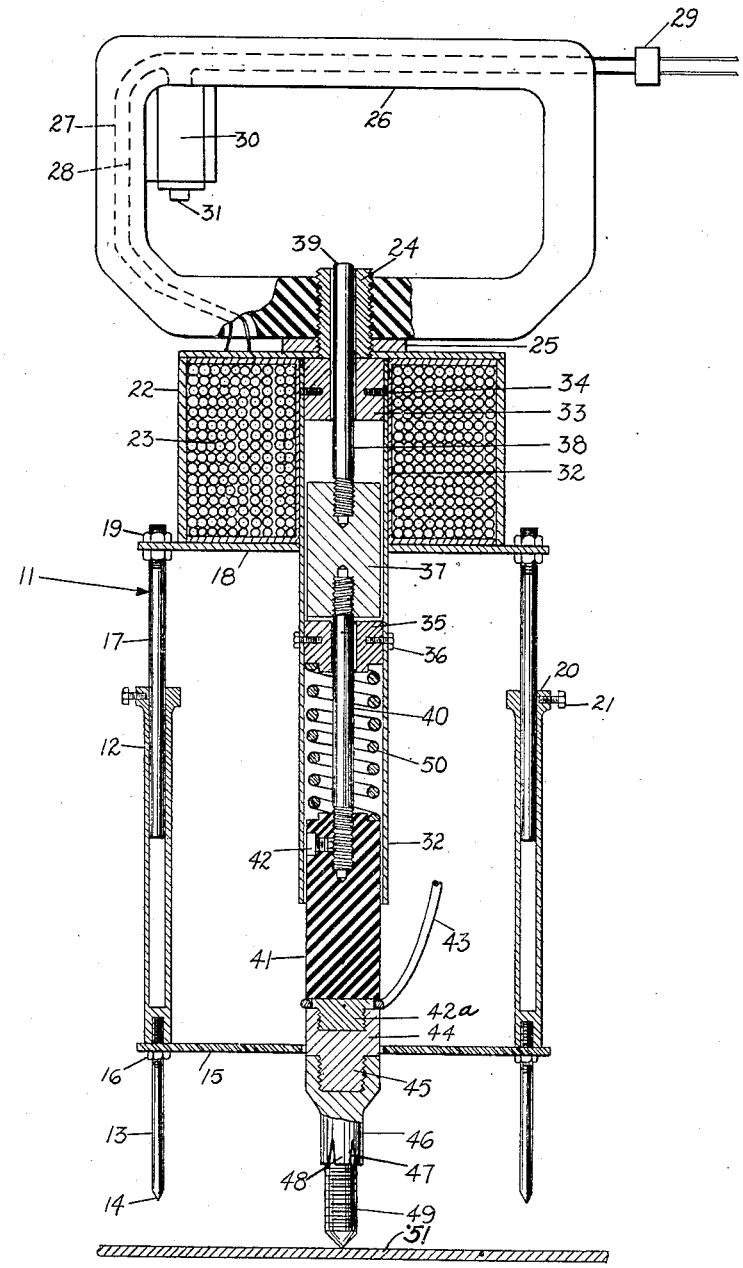

2,439,830

UNITED STATES PATENT OFFICE 2,439,830

STUD-WELDING GUN

Alfonso P. Varela, New York, N. Y.

Application March 5, 1946, Serial No. 652,201

1 Claim. (Cl. 219—4)

(Granted under the act of March 3, 1883, as amended April 30, 1928; 370 O. G. 757)

The present invention concerns a stud-welding gun suitable for end-welding studs upon a metal surface.

In performing the operation of end-welding studs upon a metal surface such as the deck of a ship, it is necessary to dispose the stud that is to be welded in perpendicular position relative to the surface upon which the weld is to be made. Electric current is passed through the stud and metal surface and the stud is withdrawn slightly from the surface to provide an electric arc, which serves to melt the end of the stud, after which the stud is returned into contact with the metal surface to provide the final weld. Studs are manufactured with welding flux formed in the end of the stud and it is necessary that firm contact originally be made between the welding flux in the end of the stud and the metal surface. It is also necessary that the exact distance by which the stud is withdrawn from the metal surface during the arcing and the time interval during which separation and arcing occur be carefully regulated.

An object of the invention is to provide a stud-welding gun.

A further object is to provide a portable gun for end-welding studs upon a metal surface.

A further object is to provide a portable gun for end-welding studs on a metal surface wherein the stud initially is held firmly in good electrical contact with the metal surface and is then withdrawn a predetermined distance and for a predetermined time from the metal surface to provide an electric arc after which the stud is returned into contact with the metal surface to form the final weld.

Further objects and advantages of this invention, as well as its construction, arrangement and operation, will be apparent from the following description and claim in connection with the accompanying drawing, in which the single figure is a view partly in elevation and partly in section of a preferred form of the invention with the parts in the position occupied when the stud is first brought into contact with the metal surface.

A framework 11 includes multiple spaced legs 12, which are vertically disposed as shown in the drawing. Threaded into the bottom of each leg 12 is a base pin 13 having a point 14. A transverse plate member 15 is mounted upon pins 13 and is secured in place by nuts 16. Transverse plate 15 serves to hold legs 12 and pins 13 together in a rigid construction. Extending upwardly from legs 12 are telescope extensions 17, which are locked together at their upper extremities by transverse plate 18 secured in place upon extensions 17 by lock nuts 19. The upward extremity of each leg 12 is provided with a collar 20 and a set screw 21 to lock extensions 17 in any desired position.

Mounted above transverse plate 18 is a housing 22 within which is disposed a solenoid coil 23. Extending upwardly from housing 22 is a threaded stud 24. Threaded upon stud 24 is a handle 26 spaced from housing 22 by a collar 25. Electrical wires 27 and 28 are provided in handle 26. Electrical wires 27 and 28 at one end connect with solenoid coil 23 and at their other ends connect through a timer 29 to a suitable source of electric current (not shown). A switch 30 having a trigger 31 is connected in series with conductor 28 for making and breaking the electric circuit including conductors 27 and 28 and solenoid coil 23.

Mounted centrally in solenoid coil 23 is a guide tube 32, which extends downwardly through transverse plate 18 and terminates above base pins 13. Located in the upper end of guide tube 32 is a stop collar 33, which is secured in place by means of set screws 34 extending through the wall of tube 32. Mounted below stop collar 33 and in spaced relation therewith is a second stop collar 35, which is secured in place by means of set screws 36. Disposed within tube 32 between stop collars 33 and 35 and arranged for sliding movement is a solenoid armature 37, which is limited in its upper movement by stop collar 33 and in its downward movement by stop collar 35. Threaded in the top end of armature 37 and extending upwardly therefrom is a signal pin 38, which extends for sliding movement through stop collar 33 and stud 24 and is exposed to view at 39. The exposed end 39 of signal pin 38 indicates to an observer the relative position of armature 37 within guide tube 32. Threaded into the bottom end of armature 37 and extending downwardly through stop collar 35 is a pin 40 having an insulator 41 mounted on the lower end thereof and secured in place by set screw 42. Depending below insulator 41 is a threaded boss 42a which forms an electrical contact to which an electric cable 43 is attached. Electric cable 43 is connected to a suitable source of current (not shown). Threaded on the boss 42a and holding the end of cable 43 in place is an adaptor 44 having a threaded boss portion 45 upon which is threaded a stud holder 46. The lower end of stud holder 46 is longitudinally split at 47 to provide a spring grip 48, which is adapted to hold a stud 49 during the welding operation.

Disposed about pin 40 is a compression spring 50, which reacts at its upper end against stop collar 35 and at its lower end against insulator 41. Spring 50 serves to urge the reciprocating part of the construction including stud holder 46, insulator 41 and armature 37 into a downward position with armature 37 against stop collar 35.

The stud-welding gun of the present invention comprises a rigid portion including legs 12, extensions 17, solenoid coil 23, handle 26 and guide tube 32. A reciprocating portion includes stud holder 46, insulator 41, armature 37 and pins 40 and 38. The reciprocating portion is urged downwardly under the influence of spring 50 but may be drawn upwardly against the action of spring 50 under the influence of solenoid coil 23 when the latter is electrically energized.

Operation of the device is as follows. The stud-welding gun is prepared for operation by inserting a conventional stud 49 in stud holder 46. Set screws 21 are loosened and legs 12 and telescope extensions 17 adjusted until points 14 at the bottom of the legs are disposed in such position that when the tool is placed against a flat metal surface 51 and pressed downwardly until points 14 rest against the surface, spring 50 is compressed until the top of armature 37 is spaced approximately $\frac{3}{16}$ of an inch below the bottom of stop collar 33. Observation of extremity 39 of signal pin 38 indicates when this condition is satisfied. Electrical conductors 27 and 28 are connected to a suitable source of current (not shown) which can be of the order of 70 volts direct current. Switch 30 is normally in open circuit position so that solenoid coil 23 is not energized. Cable 43 is connected to a suitable source of current (not shown) which can be a 400 ampere generator.

Under these conditions spring 50 is slightly compressed and a desirable contact pressure maintained upon stud 49 to insure a good electrical contact with the metal surface 51. There is about $\frac{3}{16}$ of an inch clearance between the top of armature 37 and the bottom of stop collar 33. The weld is made by pressing switch trigger 31 to close the circuit including conductors 27 and 28 and solenoid coil 23. Solenoid coil 23 is energized with the result that armature 37 is drawn upwardly $\frac{3}{16}$ of an inch into contact with stop collar 33 with the result that the tip of stud 49 is withdrawn about $\frac{3}{16}$ of an inch from the surface of the metal plate 51 at the point where the weld is to be made. This results in creation of an electric arc between the tip of stud 49 and the metal surface 51 due to the current in cable 43 with the result that the end of stud 49 is fused. Timer 29 is adjusted so that a desired time interval will elapse before the circuit including solenoid coil 23 is opened and this may be of the order of a fraction of a second. At the end of such time interval solenoid coil 23 is deenergized with the result that spring 50 forces the reciprocating part of the gun including stud holder 46 and stud 49 downwardly into contact with the metal plate 51 so that the fused end of stud 49 forms a rigid weld with the metal plate.

It is to be understood that various modifications and changes may be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

A stud-welding gun comprising a frame having a series of spaced vertical legs, a transverse member securing said legs together, each leg having an upward telescope extension, means for locking said extensions in selected position, a transverse member securing said extensions together, a solenoid coil mounted on said latter transverse member, a handle mounted on said coil, a guide tube mounted in said coil and depending toward the base of said legs, an upper stop in said tube having a central bore, a lower stop in said tube having a central bore, a solenoid armature in said tube between said stops and having its upward and downward movement limited by said stops, a signal pin on said armature extending upwardly through said upper stop and being exposed to view to indicate the position of said armature in said tube, a pin extending downwardly from said armature through said lower stop, an insulator on the lower end of said pin, a stud holder below said insulator and adjacent the base of said legs, an electrical contact between said insulator and said stud holder for conducting current through said stud holder, a compression spring between said lower stop and insulator for urging said insulator, stud holder and armature downwardly, said solenoid coil being arranged for electrical energization to reciprocate said insulator, stud holder and armature upwardly against the action of said spring.

ALFONSO P. VARELA.

REFERENCES CITED

The following references are of record in the file of this patent:

UNITED STATES PATENTS

| Number | Name | Date |
| --- | --- | --- |
| 2,191,494 | Nelson | Feb. 27, 1940 |
| 2,360,837 | Anderson | Oct. 24, 1944 |